(12) United States Patent
Riggins et al.

(10) Patent No.: US 7,380,025 B1
(45) Date of Patent: May 27, 2008

(54) METHOD AND APPARATUS PROVIDING ROLE-BASED CONFIGURATION OF A PORT OF A NETWORK ELEMENT

(75) Inventors: Chris Riggins, Pleasanton, CA (US); Steven Berl, Piedmont, CA (US); Dirk Anteunis, Fayence (FR); Arnold Stamler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 277 days.

(21) Appl. No.: 10/681,548

(22) Filed: Oct. 7, 2003

(51) Int. Cl.
*G06F 3/00* (2006.01)
*G06F 13/12* (2006.01)

(52) U.S. Cl. ............... 710/8; 710/10; 710/11; 710/14; 710/62

(58) Field of Classification Search ........... 710/8, 710/10, 11, 15
See application file for complete search history.

(56) References Cited

U.S. PATENT DOCUMENTS

| | | | | |
|---|---|---|---|---|
| 5,561,666 A | * | 10/1996 | Christensen et al. | 370/276 |
| 5,568,525 A | * | 10/1996 | de Nijs et al. | 375/356 |
| 5,574,722 A | * | 11/1996 | Slykhouse et al. | 370/257 |
| 5,625,621 A | * | 4/1997 | Christensen et al. | 370/248 |
| 5,680,397 A | * | 10/1997 | Christensen et al. | 370/421 |
| 5,687,174 A | * | 11/1997 | Edem et al. | 370/446 |
| 5,764,909 A | * | 6/1998 | Nishimura | 709/223 |
| 5,964,852 A | * | 10/1999 | Overton | 710/62 |
| 6,026,078 A | * | 2/2000 | Smith | 370/258 |
| 6,175,882 B1 | * | 1/2001 | Bunton et al. | 710/14 |
| 6,278,695 B1 | * | 8/2001 | Christensen et al. | 370/254 |
| 6,339,831 B1 | * | 1/2002 | Sugawara et al. | 714/3 |
| 6,611,518 B1 | * | 8/2003 | Ngo et al. | 370/386 |
| 6,981,033 B2 | * | 12/2005 | Simpson | 709/220 |
| 2002/0178366 A1 | * | 11/2002 | Mattila | 713/156 |
| 2003/0012182 A1 | * | 1/2003 | Sato | 370/352 |
| 2003/0169761 A1 | * | 9/2003 | Duncan et al. | 370/449 |
| 2003/0188017 A1 | * | 10/2003 | Nomura | 709/241 |
| 2004/0081196 A1 | * | 4/2004 | Elliott | 370/465 |
| 2004/0090964 A1 | * | 5/2004 | Reed et al. | 370/395.4 |

OTHER PUBLICATIONS

Cisco Systems, Inc., Keith McCloghrie, et al., "Cisco Discovery Protocol (CDP)," 1998, 1999, 2000, 2001, 2002, 12 pages.
Cisco Systems, Inc., "Using Content Networking to Provide Quality of Service," 1999, pp. 1-8.
Cisco Systems, Inc., "DHCP Options," Appendix B, Network Registrar User's Guide, pp. B-1-B-28.

* cited by examiner

*Primary Examiner*—Niketa Patel
*Assistant Examiner*—David Martinez
(74) *Attorney, Agent, or Firm*—Hickman Palermo Truong & Becker LLP

(57) ABSTRACT

A method of automatically configuring a port of a network element comprises the steps of discovering information that identifies or describes a second network element that is coupled to a port of a first network element; associating the port with a port role definition selected from a plurality of port role definitions based on the discovered information; retrieving one or more configuration settings that are associated with the selected port role definition; and applying the one or more configuration settings to the port.

46 Claims, 7 Drawing Sheets

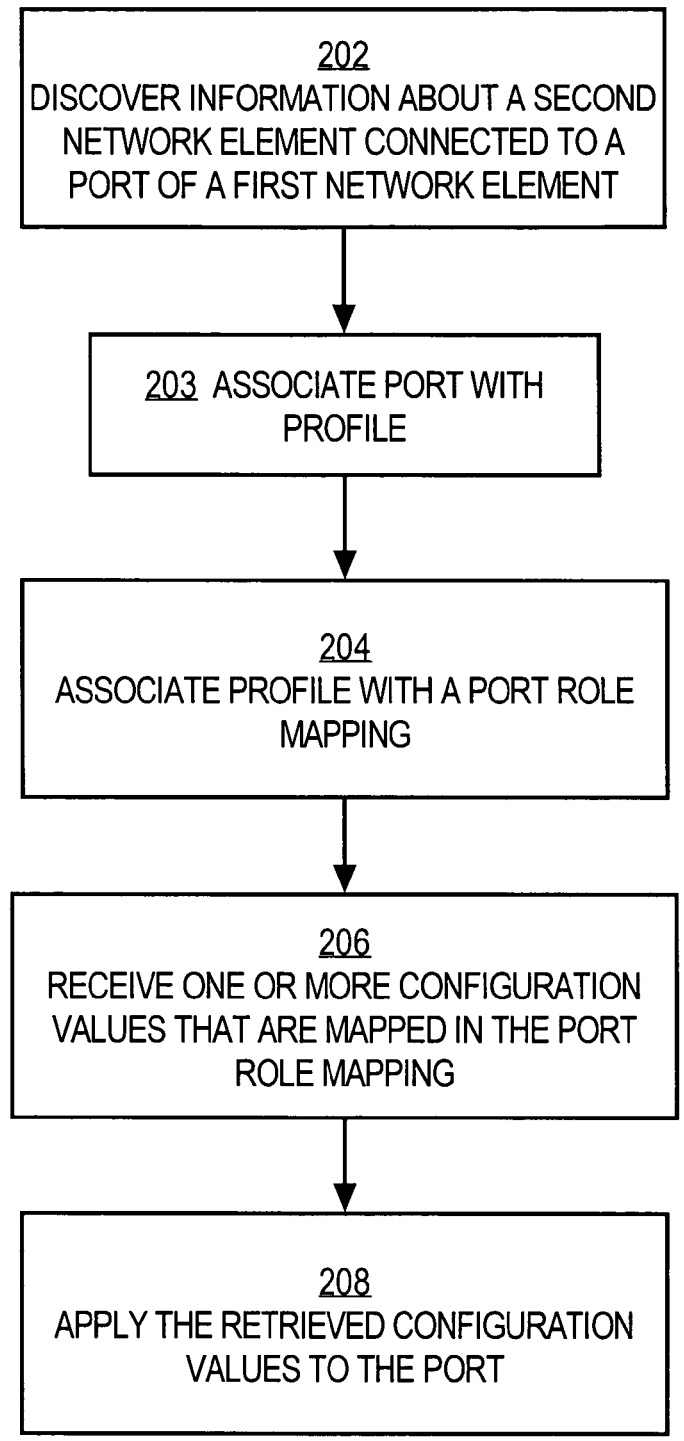

*Fig. 4*

| 402 PROFILE NAME | 404 PROFILE RULE | 406 ROLE NAME |
|---|---|---|
| 402A PRINTER | 404A TYPE = printer AND IDENTITY = "*-PRINTER" | 406A PRINTER-ROLE |
| 402B PHONE | 404B TYPE = VOIPphone | 406B PHONE-ROLE |
| 402C BACKBONE | 404C TYPE = router AND IDENTITY = "*BBROUTER" AND PLATFORM = "Cisco*" | 406C BACKBONE-ROLE |
| 402D PC | 404D IDENTITY = "*-PC" | 406C PC-ROLE |
| | | |

*Fig. 5*

| 502<br>ROLE NAME | 504<br>CONFIGURATION SETTINGS |
|---|---|
| 502A<br>PRINTER-ROLE | 504A<br>Bandwidth = 10mb<br>QOS = <printer qos settings> |
| 502B<br>PHONE-ROLE | 504B<br>Bandwidth = 100mb<br>QOS = <phone qos settings> |
| 502C<br>BACKBONE-ROLE | 504C<br>Bandwidth = 1000mb<br>QOS = <backbone uplink qos settings> |
| 502D<br>PC-ROLE | 504D<br>Bandwidth = 10mb<br>QOS = <pc qos settings> |
|  |  |

METHOD AND APPARATUS PROVIDING ROLE-BASED CONFIGURATION OF A PORT OF A NETWORK ELEMENT

FIELD OF THE INVENTION

The present invention generally relates to network management. The invention relates more specifically to a method and apparatus providing role-based configuration of a port of a network element.

COPYRIGHT NOTICE

A portion of the disclosure of this patent document contains material which is subject to copyright protection. The copyright owner has no objection to the facsimile reproduction of the patent disclosure, as it appears in the Patent & Trademark Office patent file or records, but otherwise reserves all copyright rights whatsoever. Copyright© 2003 Cisco Systems, Inc.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks, network elements such as routers, switches and others are responsible for moving packetized information within the network and directing the information to end station devices. Information arriving at or sent from a network element is communicated using one or more ports. A port may have a direct physical association with a chassis connector that terminates a network cable. Additionally or alternatively, port(s) may have a logical association with a connector.

The role that a port plays in a network element, or the identity of the neighbor of the port, can dictate a specific configuration for that port. For example, the configuration of a switch port that is connected to a PC might be very different than the configuration of the same port when connected to a business-critical server. As another hypothetical example, the configuration of the port might be different if a WAN link to a distant router is attached as opposed to a lab router connected via a LAN. To configure the port correctly, network administrators need to know the role of a port or the identity of the device to which it is attached.

At present, acquiring such knowledge is a manual process. The manual process is time-consuming and requires manual record-keeping. Further, if an end station device is changed, a port connected to that device may require re-configuration to account for differences in the new end station device. Currently, this requires manual intervention by an administrator, which is costly.

The Cisco Networking Services (CNS) solution from Cisco Systems, Inc. can discover information about the physical setup of modular routers including what kind of ports are present; however, CNS does not determine information about which devices are connected to the ports that it has discovered.

In one related approach, an "Auto-Configuration" mechanism uses a Trivial File Transfer Protocol (TFTP) server to load a configuration to a network switch. The Cisco Intelligent Engine 2100 (IE 2100) uses a similar approach, but transfers configuration information using HTTP. However, both of these approaches impose configuration challenges relating to proper configuration of the associated servers, and impose higher costs for servers on their users. Further, while the IE2100 can dynamically create a configuration for a device based on the types of ports discovered, it cannot do so based on what devices are connected to the ports.

In another approach, a network switch or router stores one or more role-based macro configuration templates. Each template is associated with a LAN switch role, such as "access," "distribution," or "core." The templates apply particular configuration commands to interfaces of the switch depending on the associated role of the switch port. However, this approach does not discover devices that are connected to ports of the switch in the network, and does not determine what role is played by devices that are connected to ports of the switch. The network administrator is required to use a separate manual process to perform any such discovery and role determination, with the associated burden of keeping appropriate records and responding to changes manually as the changes occur. The approach also does not automatically apply a different configuration to each port based on determining the role of a connected device.

In another approach, RADIUS attribute-value pairs may be used to provision services on sessions based on the identity of a user; in this context, a session is defined by information specifying a port and a user for a period of time. For example, a user dials in to an access router, PPP authentication is performed via RADIUS, and the RADIUS reply contains configuration parameters for a port that are applied by the access router. When the connection terminates, a default configuration is restored to the port. However, this approach does not establish a port configuration based on the type of device coupled to the port or the role played by the port with respect to the device.

Thus, there is a need in this field for an improved automated way to configure ports of network elements based on discovering what devices are connected to the ports and what roles the ports or devices have in the network.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates a high level overview of one embodiment of a method for role-based configuration of a port;

FIG. 4 is a block diagram of example device port profile rules;

FIG. 5 is a block diagram of an example device port role mapping; and

DETAILED DESCRIPTION OF THE PREFERRED EMBODIMENT

Figure 1:
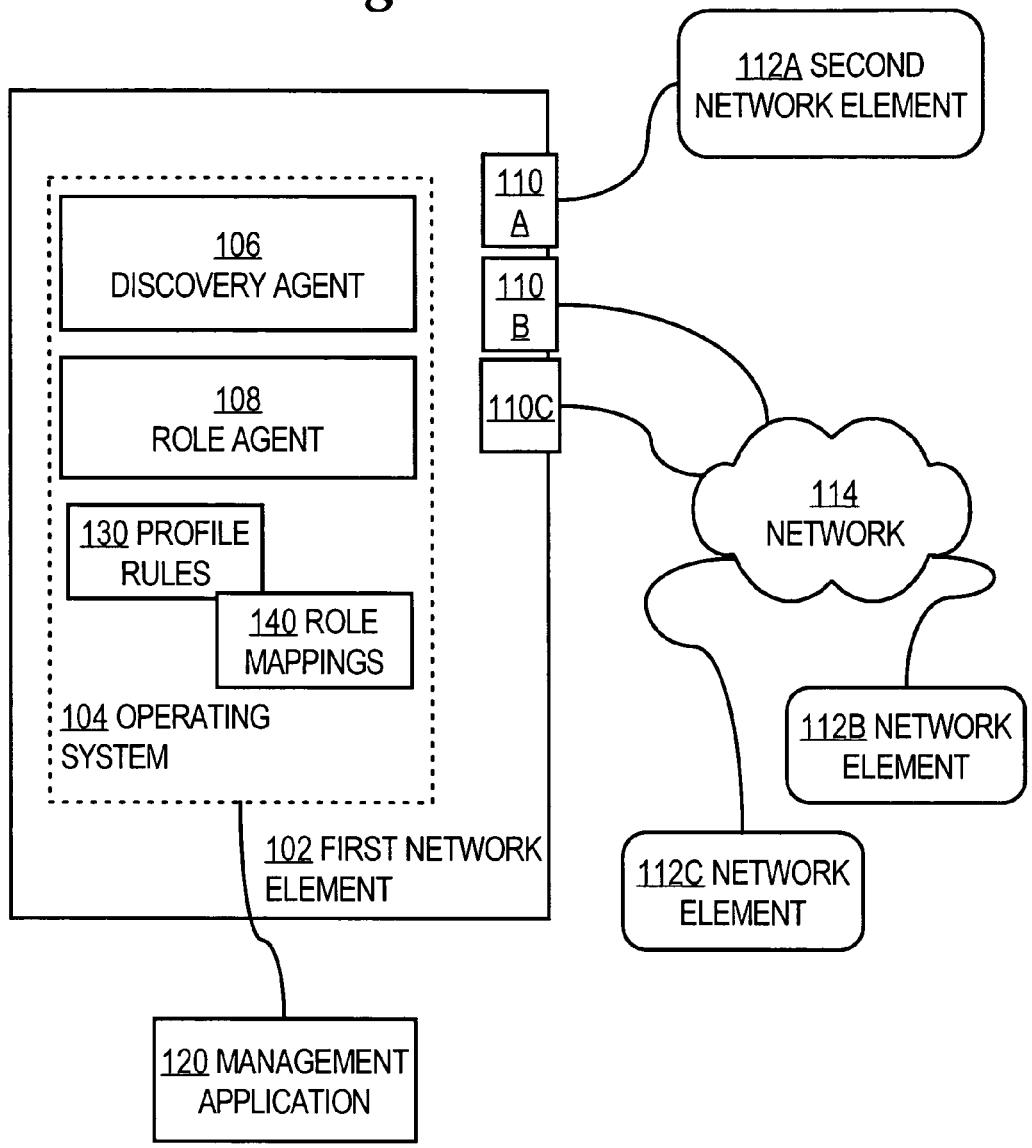
FIG. 1 is a simplified block diagram of a network element configured to provide role-based configuration of a port.

A method and apparatus providing role-based configuration of a port of a network element is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Architecture
   2.2 Role-Based Configuration Approaches
   2.3 Complete Example
   2.4 Time of Execution
   2.5 Interaction with Management Applications and Other Solutions
   2.6 Applicability to Physical Ports and Logical Ports
   2.7 Failure Processing
3.0 Implementation Mechanisms-Hardware Overview
4.0 Extensions and Alternatives

1.0 GENERAL OVERVIEW

The needs identified in the foregoing Background, and other needs and objects that will become apparent for the following description, are achieved in the present invention, which comprises, in one aspect, a method for automatically configuring a port of a network element, comprising the steps of discovering information that identifies or describes a second network element that is coupled to a port of a first network element; associating the port with a port role definition selected from a plurality of port role definitions based on the discovered information; retrieving one or more configuration settings that are associated with the selected port role definition; and applying the one or more configuration settings to the port.

According to one feature of this aspect, the step of associating a port with a port role definition comprises the steps of mapping the port to a profile selected from a plurality of profiles based on the discovered information; and matching the profile to a port role definition. In another feature, a profile comprises a profile identifier; and one or more rules that maps one or more ports to the profile based on the discovered information. In another feature, a port role definition comprises a port role definition identifier, and one or more configuration values that can be applied to a port that is associated with the port role definition. In yet another feature, the configuration values comprise one or more configuration attributes and value pairs for the port.

According to yet another feature, the configuration values comprise one or more quality of service values for the port. In still another feature, the discovered information comprises a type identifier of the second element; and an identity identifier of the second element. In another feature, the type identifier of the second element is the capabilities TLV or platform TLV of a Cisco Discovery Protocol (CDP) message from the second element; the identity identifier of the second element is the sysName TLV of a CDP message from the second element.

In still another feature, the method further comprises providing the discovered information to a management application; receiving one or more configuration settings from the management application; applying the configuration settings to the port. In another feature, the additional configuration settings are generated based on the discovered information. The first element may be programmed to automatically configure a selection of one or more ports from a plurality of ports. The steps may be performed when the first network element boots up, or the steps are performed for a particular port of the first network element when said port becomes active after a period of inactivity, or the steps are performed at a specified periodic time interval.

In another feature, the step of discovering information comprises receiving a Cisco Discovery Protocol (CDP) message from the second element, and extracting a Capabilities type-length-value (TLV) or platform TLV and a sysName TLV from the message. In another feature, the profile further comprises a counter indicating a number of ports to which the profile is currently mapped. The profile may further comprise a counter indicating a number of ports to which the profile is currently mapped, and the steps of retrieving and applying may be performed only when the counter is less than or equal to one.

In various other embodiments, the first network element is a switch or router; the second network element is a personal computer, phone, router, server, or storage device; and the step of discovering is performed by a protocol selected from the set consisting of Cisco Discovery Protocol, Network-Based Application Recognition, Netflow, SSG, 802.1x, and Simple Network Management Protocol. In an embodiment in which the step of discovering is performed by Simple Network Management Protocol, the discovered information comprises a sysDescr object and sysObjectID of a MIB of the second network element.

In other aspects, the invention encompasses a computer apparatus and a computer-readable medium configured to carry out the foregoing steps.

2.0 STRUCTURAL AND FUNCTIONAL OVERVIEW

According to one embodiment, a port of a network element automatically detects its role in a network based on the type or identity of a device to which the port is connected. A configuration of the port is set automatically to match the requirements of the device attached to that port. In one approach, a combination of network element intelligence and a management application provides an environment in which a network element makes an educated guess about the nature of the role of a port, or the identity of a neighbor. The network element uses that information, alone or in conjunction with other management applications, to automate the configuration of the port. In one embodiment, the management application is the Cisco CNS configuration engine, from Cisco Systems, Inc., San Jose, Calif.

2.1 Architecture

FIG. 1 is a simplified block diagram of a network element configured to provide role-based configuration of a port. A first network element 102 comprises an operating system 104 having a discovery agent 106 and a role agent 108. In one embodiment, network element 102 is a switch, router, or other network infrastructure element, such as a 7200 series router from Cisco Systems, Inc. Operating system 104 may be the Cisco IOS® operating system.

First network element 102 also comprises one or more ports 110A, 110B, 110C that are communicatively coupled, directly or indirectly through one or more networks 114, to second network elements 112A, 112B, 112C, etc. Each of the second network elements 112A, 112B, 112C may be a switch, router, or other network infrastructure element, or an end station element such as a personal computer, workstation, server, printer, phone, etc.

Optionally, first network element 102 also is communicatively coupled to a management application 120 for purposes of configuring or managing the first network element. In other embodiments, the management application may execute within the first network element. For example, a personal computer running Linux can be configured to act as a router and may concurrently execute a network management application, or the Linux router PC may interoperate with a second PC that runs the network management application. Thus, the specific location of the management application or process is not critical to embodiments of the invention.

Role agent 108 can access one or more stored profile rules 130 and one or more role mappings 140. In one embodiment, profile rules 130 map discovered device identity information to profile names and role names, and each of the role mappings 140 maps a role name to one or more configuration settings, commands or values. Alternatively, role mappings 140 may contain the configuration settings, commands or values. Such configuration settings, commands or values may comprise any valid expression that conforms to a configuration language of a network element. FIG. 4 is an example of profile rules 130, and FIG. 5 is an example of role mappings 140. FIG. 4 and FIG. 5 are described further below.

Discovery agent 106 and role agent 108 each comprise one or more software elements, hardware elements, or a combination thereof that are configured to perform the functions that are described herein. Discovery agent 106 and role agent 108 cooperate with one another, and optionally with management application 120, to provide automated configuration of a port of the first network element as further described herein. Generally, discovery agent 106 discovers the particular kind or identity of device 112A, 112B, 112C that is coupled to the other end of each port or interface of a network element. Role agent 108 decides which role is assigned to different network elements. The following sections present specific approaches and examples of the preceding general principles.

2.2 Role-Based Configuration Approaches

FIG. 2 is a flow diagram that illustrates a high level overview of one embodiment of a method for role-based configuration of a port.

In block 202, the method discovers information about a second network element that is connected to a port of a first network element. For example, discovery agent 106 of first network element 102 discovers information about second network element 112A, which is communicatively coupled to port 110A. In general, discovery agent 106 discovers role information and identity information for each second network element that is connected to each port or interfaces of network element 102. Discovery agent 106 may use any of a variety of protocols to deduce or derive such information.

In one embodiment, Cisco Discovery Protocol (CDP) is used for devices that support CDP; a detailed description of CDP is provided herein as Appendix 1. CDP-enabled devices share a number of information elements with their peers, via several CDP type-length-value (TLV) elements. In particular, a Capabilities TLV specifies a device type (such as router, switch, bridge, IP phone, etc), and can be used to determine a port role in the approaches herein. The Platform TLV provides a very specific device type, e.g., "Cisco IP Phone Model 7960" and therefore can be used to determine a role. Further, the sysName TLV specifies a system name, and can be used to determine a device identity herein. The Capabilities TLV, Platform TLV, and sysName TLV are examples of information that identifies or describes a network element and that can be used in approaches that use CDP. In various other embodiments, different information from CDP, or any other descriptive or identification information that may be available from other protocols, may be used as a basis for determining a port role.

Devices that support CDP include a CDP database for locally storing information describing all immediately adjacent Layer 2 devices; software in the device can query the CDP database to determine the identity of neighbors. CDP is a one hop multi-cast protocol. Therefore, the CDP database in a device may contain information about more than one neighbor for a given port. For example, if a port on a first network element is attached to a Ethernet LAN hub network element, then all of the devices attached to that hub are recorded as neighbors of that port in the CDP database of the first network element. In this case, the profile for this port may not be as deterministic than if it happens to connect to a more intelligent second device.

In other embodiments, Simple Network Management Protocol (SNMP), Network-Based Application Recognition (NBAR), and Netflow protocols may be used to assemble information that can be used to determine port role or device identity. For example, if the first network element 102 has Internet Protocol (IP) connectivity to the second network element 112A, and the first network element has the SNMP read credentials for the second network element, then SNMP can be used to discover information identifying the second network element. For example, MIB II objects can be used to identify the second network element. In one approach, the sysDescr object may be used to derive an identity value, and the sysObjectID object may be used to determine a role.

In another approach, the protocols 802.1x, point-to-point protocol (PPP) and Cisco Service Selection Gateway (SSG) establish a user identity at the port level or circuit level, and then use that identity together with authorization information to allow IP connectivity or to select a specific type of connectivity service. For example, SSG provides a user identifier of a logged-in user, group, or role as determined by an authentication, access and accounting (AAA) server, such as a RADIUS sever. In the absence of CDP information, the user identity information developed using these protocols may be used as an identity value herein, or the user identity information could augment the identity information that is available through CDP. However, these protocols provide user identity information rather than information identifying network elements. In addition, information accessible using from these protocols may reside at a network element that is several hops away from a first network element of interest.

The NBAR protocol extracts, from packets arriving on a port, information identifying an application that sent the packet. NBAR is a component of Cisco IOS®, and is generally described in the 1999 white paper, "Using Content Networking to Provide Quality of Service," which is published at the Cisco public website, cisco.com. Information provided by NBAR may be used to determine the purpose of a packet. NBAR can detect packets from applications such as SAP, web browsers that generate HTTP traffic, telnet, email traffic that uses POP3, FTP, as well as routing protocols such as BGP, EIGRP, RIP. Information detected by NBAR is stored in a local NBAR database on a network device. Information in the NBAR database can be queried using "show" commands, an internal API, or through an SNMP MIB, or any other mechanism suitable for use by a management application.

Thus, NBAR is preconfigured to understand many or all of the protocol types that may be used to determine the role of a port. Using the information stored in the NBAR MIB, the role of a device attached to the port may be deduced. For example, if NBAR indicates that a particular port is carrying a high volume of HTTP traffic, then role agent 108 may determine that the port is connected to a Web server and apply an appropriate profile, role and configuration. In contrast, if the port is carrying routing protocol packets, then role agent 108 can determine that the port is connected to a routing device.

NBAR does not collect source IP address information related to the application types so NBAR by itself is not deterministic. Thus, in one approach using NBAR, role agent 108 may generate a proposed role and provide a suggestion to a network administrator through a trap or other notification mechanism. Alternatively, the proposed role may be communicated to management application 120, for confirmation by the administrator.

In still another approach, the Netflow feature of Cisco IOS® is used as a basis for determining a role of a port. Netflow collects information about packets flowing through a device, including source IP address, source TCP/UDP port, and input interface. In one embodiment, discovery agent 106 scans the collected Netflow information and finds records for a given input interface that specify the type of traffic that is coming from the second network element that is connected to that interface. Based on such records, role agent 108 determines the role of the second network element. For example, the role agent 108 determines which well-known TCP/UDP port value is represented in the Netflow records, and then performs a table lookup in a mapping that associates port values to roles.

While CDP efficiently provides sufficient information for determining a role and identity of the second network element 112A, the alternate protocols that can be used to determine role and identity of a non-CDP second network element 112C may negatively impact performance of the first network element 102. Accordingly, in one approach, a default role is applied to a port or interface that does not have a CDP-enabled device attached.

Discovery agent 108 is programmable so that management application 120 or another external system can instruct the discovery agent what domain of objects on which to operate. For example, management application 120 may determine that it needs to determine a role only for port 110B. In that case, management application 120 may send programming information or configuration information to discovery agent 108, or invoke a specified method or function of the discovery agent that is exposed to the management application through an API, to instruct the discovery agent only to process a particular port. The instructions and method calls also may instruct discovery agent 108 about what interface types to process, such as only Ethernet interfaces, only Fast Ethernet interfaces, serial interfaces, optical interfaces, etc., or what range of interfaces to process, e.g. only odd-numbered interfaces. The instructions issued by management application 120 may be based on network topology or other pertinent data.

Further, management application 120 may use the API or method invocations to deliver a set of rules that map Role and Identity information into a specific Profile. For example, a rule may specify:

IF type=any-router AND identity MATCHES 'london*' THEN profile=London-Profile

Referring again to FIG. 2, in block 203, the port of the first network element is associated with a port profile. In one embodiment, the result of processing by discovery agent 108 is information for each port that associates the port with a particular profile. Thus, the resulting information essentially indicates, for a port "xyz," that "port xyz matches profile abc", where "abc" is one of a plurality of stored profiles.

In block 204, the profile is associated with a port role definition. Role agent 108 performs block 204, in one embodiment. For example, role agent 108 maps profiles to roles that translate into configuration settings on the specified port. In block 206, one or more configuration values that are associated with the port role definition are received. Simple roles may result in retrieval of an enumeration of attribute-value pairs that need to be applied to a port. Attribute-value pairs may specify how to configure Voice VLAN, CAR, non-forwarding of BPDU, protected port, ACLs, IP address, DHCP indications like scope for obtaining an IP address, etc.

Figure 3A:
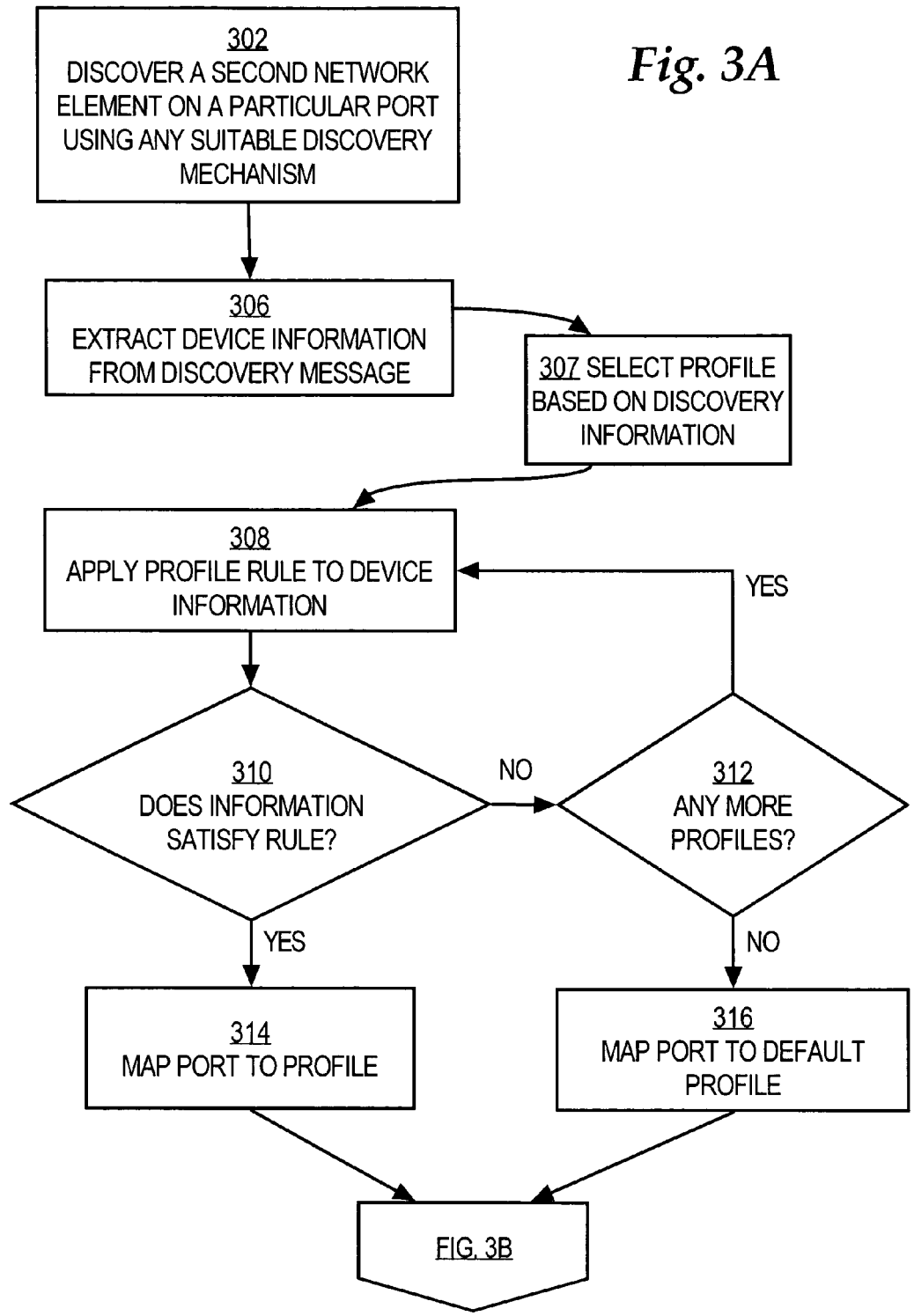
FIG. 3A is a flow diagram that illustrates another embodiment of a method for role-based configuration of a port.
Figure 3B:
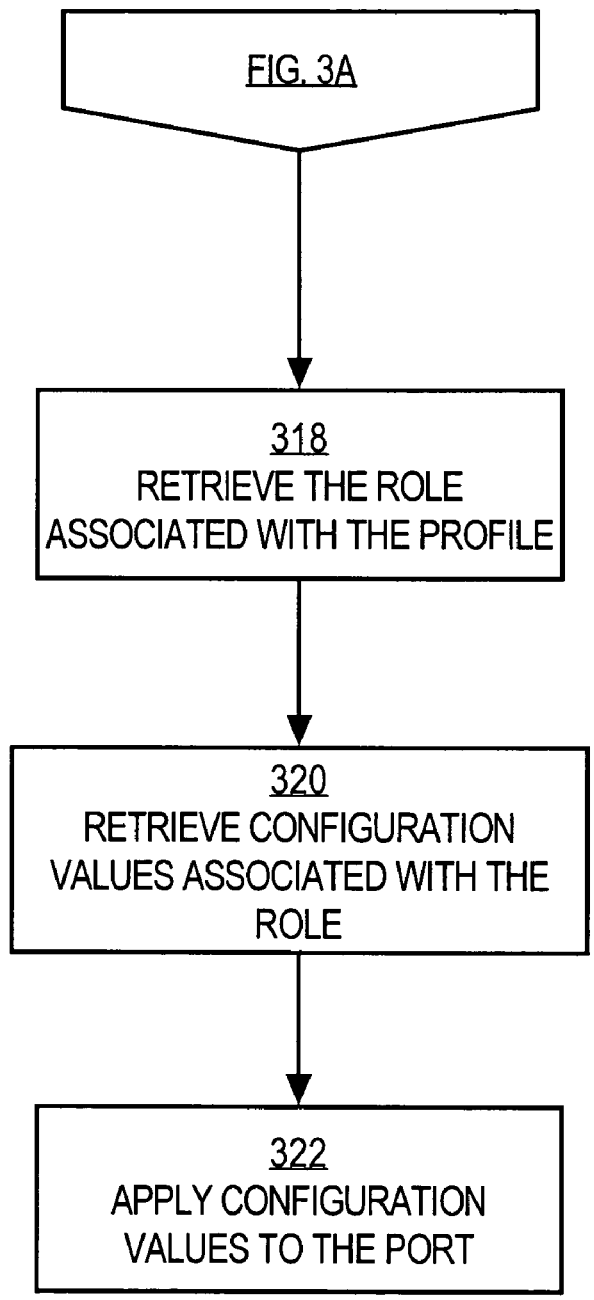
FIG. 3B is a flow diagram showing further steps in the method of FIG. 3A.

In performing block 204 and block 206, role agent 108 may collect all the roles associated to the matched profile(s) or the port, and using fuzzy defaulting and precedence rules, create a collection of configuration attributes to be applied to or configured on the port. This procedure is now described in further detail with respect to FIG. 3A and FIG. 3B. FIG. 3A is a flow diagram that illustrates another embodiment of a method for role-based configuration of a port, and FIG. 3B is a flow diagram showing further steps in the method of FIG. 3A.

Referring first to FIG. 3A, in block 302, a first network device discovers a second device on a particular port of the first network device. Any of several discovery mechanisms can be used. For example, if the network elements support CDP, then the first network element 102 queries its CDP database for all entries associated with port 110A. If SNMP is used, then an SNMP query is issued to the second network element. If NBAR is used, then an SNMP query is issued to the NBAR MIB on the first network element.

In block 306, device-related Role and Identity information is extracted from the results of the operation performed in block 302. In the case of CDP, first network element 102 extracts the Capabilities TLV or Platform TLV and sysName TLV from the CDP database for port 110A. The CapabilitiesTLV or Platform TLV is used to determine a device type, and the sysName TLV specifies a system name that is used to determine a device identity. Blocks 302, 304, and 306 may be performed by discovery agent 106.

In block 307, a profile is selected from among profile rules 130 based on the discovered information. In block 308, a profile rule is applied to the device information. By use of the approach herein in which a port is used to match a profile and a profile is associated with a role, enables the system to self-configure ports for many different purposes. As an example, assume that profile rules 130 comprise the following rules:

1. "London-profile" → other-end-hostname MATCHES 'london.*' AND other-end-devtype == any-router
2. "Dubai-profile" → other-end-hostname MATCHES 'dubai.*' AND other-end-devtype == any-router
3. "Core-Ring-profile" → other-end-devtype == any-router AND wire-type == GigaEthernet AND NOT (other-end-hostname MATCHES 'london.*') AND NOT (other-end-hostname MATCHES 'dubai.*')

While in this example each profile maps to a different role, in other examples, many profiles can map to the same role. Assume further that role mappings 140 comprises:

1. Link-to-London.role → ip-addr = unnumbered; IP-unnum-param = &Core-Uplink-role.interface.7
2. Link-to-Dubai.role → ip-addr = 144.23.34.52; netw-mask = /30; ACL= 222

3. Core-Uplink-role => → interface-type = dot1Q; subinterface=(VLAN = 7; ip-addr = 144.23.4.42; netw-mask = /30); subinterface = (VLAN =8, ip-addr = 144.23.34.53; netw-mask = /30; ACL= 222)

Using these definitions, after discovery is performed at block 202, the discovered profiles of ports are matched to roles maintained by the role agent 108, and specific sets of changes to port configurations are made automatically. Thus, in this example block 307 and block 308 would involve applying each of the rules defined above to the discovered sysName (Identity) and Capability or Platform (Role) values.

An approach that relies on use of the CDP sysName TLV for the identity of a connected device assumes that values for the CDP sysName TLV are set by network administrators and are generally unique within the domain of their control. Such network administrators are expected to create profile rules 130 and to ensure that each profile is unique with respect to identity information. If multiple devices are given the same sysName value and thus have the same identity information, then such devices potentially could have the same profiles applied.

Applying the same profiles could be a desired behavior, or it could be an accident. For example, an administrator may wish to have multiple identities so that one profile is applied to more than one port. In one embodiment, the system of FIG. 1 may include a repository of information about which profiles have been applied to which ports. Further, the system of FIG. 1 and the processes of FIG. 2, FIGS. 3A-3B may maintain a counter reflecting a use count on each profile such that a profile may be used once and only once. In one embodiment, the counter tracks the number of ports to which a profile is currently mapped. Thus, when an IP phone is plugged into a port, the counter for the phone profile is incremented, and when the IP phone is unplugged the counter decrements; if two IP phones are currently plugged in then the value of the counter is 2. This has implications for memory use on devices with many ports or profiles.

To allow a single profile to be assigned to multiple identities, discovery agent 106 can process wild cards in its matching logic. For example, assume that an organization has a policy that all corporate printers are given a name of the form "<building-location>-printer" and that the corporate printers are all CDP enabled. Discovery agent 106 is given a profile of the form:

Corporate-Printer → Type=printer and Identity="*-printer"

Using CDP information collected by the switch to which the printers are connected, any device information that matched the foregoing rule is assigned a Corporate-Printer profile. As a result, the Corporate-Printer profile is used for as many printers as match the profile rule.

As shown in block 310, a test is performed to determine whether the discovered information satisfies a particular rule. If not, then in block 312 a test is performed to determine whether other profiles are available for testing. If the test of block 312 is true, then control returns to block 308 and block 310 for processing of the other profiles. If the test of block 312 is negative, then in block 316 the then-current port is mapped to a default profile.

If a match occurs at block 310, then control transfers to block 314, in which the then-current port is mapped to a profile selected from among profile rules 130.

Referring now to FIG. 3B, in block 318, the role associated with the mapped profile is retrieved. For example, role agent 108 retrieves a role from among stored role mappings 140. In block 320, configuration values associated with the role are retrieved from storage. In block 322, the retrieved configuration values are applied to the then-current port.

Using this approach, a port is automatically configured according to a role played in the network by a device connected to the port, and the automatic configuration may be dynamic. For example, if a port is connected to a router and that router identifies itself as London (the London profile), then a set of configurations (the "London role") are applied to the port. If at some later time, the same port is connected to a router identified with Dubai, then the Dubai role is applied to the port. As a result of using the approaches herein, in which a network element can make configuration changes to itself automatically based on information collected about its neighbor devices, the cost of network management due to accidental changes to connections to a port is eliminated or greatly reduced, because the network device adapts to the change automatically.

As another example, assume that network element 102 is a local area network switch that has multiple physical ports attached to several different types of devices such as printers, servers, uplink to corporate backbone, desktop computers, IP phones, etc. Based on the type of the device on the other end of a port, the port configures itself for specific QoS policies, a VLAN assignment, etc. If two network cables are physically switched, e.g., if a port connected to a server and a port connected to a desktop are switched, then the ports are reconfigured automatically to configurations that are specific to the device to which the ports now connected. No network engineer is needed to reconfigure the ports to match the change in physical connectivity or to physically change the connections back to the original configuration.

2.3 Complete Example

A complete example is now provided with reference to FIG. 4 and FIG. 5. FIG. 4 is a block diagram of an example device port profile. FIG. 5 is a block diagram of an example device port role definition. In this example, profiles and roles for building switch port settings are described.

Assume that a two-story office building is part of a corporate complex and is comprised of offices, cubicles, and conference rooms. Each floor has four network switches and the building has one router that interconnects the switches to a corporate network backbone. Each switch has 24 Ethernet/Fast Ethernet/Gigabit Ethernet ports, of which 23 ports are for local devices and one port is for uplink to the backbone router. Assume further that all Cisco switches and routers are used, all printers are HP CDP-capable printers, and the rooms include IBM PCs and Cisco IP telephones.

Further assume that all devices in the building follow standard naming conventions. For example, PCs are all named <user-id><#>-PC. All printers are named <building-floor-location>-PRINTER. All IP-phones in the building are named <user-id><#>-PHONE. All switches are named <building-floor-location>-SWITCH. All backbone routers are named <building-location>-BBROUTER. All the switches, routers, IP phones and printers are CDP enabled. The PCs are not CDP enabled.

Assume that the default switch port configuration is:
Bandwidth=10 mb
QOS=<pc qos settings>

Also assume that the profiles shown in FIG. 4 and the roles shown in FIG. 5 are programmed into the switches.

Now assume that Switch 1 of Building 1 boots and initiates the approaches herein. Switch 1 supports CDP and has a port designated Port 1 that is connected to an IP phone that an administrator previously named "astamler7-PHONE". The IP phone, which is CDP-enabled, periodically issues a CDP announcement packet that includes a Capabilities TLV device type value indicating "VOIPphone" and a sysName TLV value indicating "astamler7-PHONE". Switch 1 updates its CDP database upon receiving the CDP announcement. Discovery agent 106 queries the CDP database for information associated with Port 1, applies the profile rules of FIG. 4 and finds a match for a profile name 402 of PHONE 402B, because the rule "TYPE=VOIPphone" 404B is TRUE for the received Capabilities TLV value. Therefore, discovery agent 106 determines that Port 1 has role 406B, the "PHONE-ROLE."

Role agent 108 of Switch 1 then retrieves role mappings 140 of FIG. 5. Role agent 108 determines that PHONE-ROLE 502B of FIG. 5 is associated with configuration settings 504B. Therefore, role agent 108 applies the indicated configuration settings to Port 1. As a result, Port 1 is set with a bandwidth of 100 mb, and specified QoS values.

Switch 1 then proceeds to query the CDP database, determine a profile and role, and apply a configuration to ports 2-23. Assume that a query to the CDP database for Port 2 results in receiving a sysName TLV having a value of "IDENTITY=JUPITER-SERVER." The profile rules 130 of FIG. 4 have no entry for such an identity value. Therefore, discovery agent 106 fails to find a match against any stored profile. As a result, discovery agent 106 assigns a default role to Port 2. Further, role agent 108 maps the default role to the default configuration, and applies the default configuration to Port 2.

The foregoing process is repeated for all other ports of Switch 1. Other switches perform a similar process. The process may be repeated if ports become inactive and re-activate, or according to a specified schedule. Using these profiles and roles, users may randomly change connections to ports of the building switches, and the ports always will have the right configurations based on evaluation of the profiles and rules using the approaches described above.

2.4 Time of Execution

The discovery agent 106 may execute at different times and for different ranges of ports of a first network element. For example, in one embodiment the discovery agent 106 executes at device boot time for all targeted ports of a device. In another embodiment, the discovery agent 106 executes only when a port initiates operation, and only configures the port that just initiated operation. In yet another embodiment, the discovery agent 106 executes according to one or more specified time periods, and configures all targeted ports. In general, the role of a port is expected to change relatively infrequently, so that discovery agent 106 most often will execute in response to boot and status change events. Ports that do change often could be excluded from a list of ports to evaluate in a particular network element. For example, ports of a device terminating at a frequently used conference room, such that many different PCs and other devices are regularly connected to the ports, could be excluded from the list of ports to evaluate.

2.5 Interaction with Management Applications and Other Solutions

Optionally, the discovered port information is provided to management application 120. The management application 120 can use the discovered port information to aid in the creation of topology-specific configuration files. Alternatively, management application 120 can instruct the role agent 108 to apply configuration changes to ports as they are discovered.

The approaches herein may be integrated with other network management solutions and systems. For example, CNS can deliver the roles and profiles to the device as part of a configuration file, or can process information returned by the discovery agent 106 to make configuration changes, and send such changes back to the device 102. Further, device identity information that is developed by the Cisco Service Selection Gateway (SSG) in its normal operation may be used to provide or augment the identity information used by the approaches herein.

2.6 Applicability to Physical Ports and Logical Ports

The approaches herein are applicable to physical ports and logical ports. In one embodiment, applying the approaches to physical ports is expected to yield the most value for the least CPU utilization. In this approach, CDP can be used to find neighbor network elements of a port, and type and identity information for the neighbor elements. In the case of a one-to-many device CDP neighbor mapping for a port, the profile of that port becomes less deterministic. If CDP is not available, then SNMP, NBAR or Netflow may be used. Use of NBAR or Netflow involves packet sniffing, and use of SNMP requires the first network element to have proper SNMP credentials to query neighbor devices. Further, with SNMP, the identity of neighbor devices could be determined by packet sniffing or by providing device information to the discovery agent 106.

When the approaches herein are used with a logical port, packet sniffing is performed to determine the types of logical traffic on a port. For example, packet sniffing might indicate that traffic over a port is marked with VLAN identifiers, ATM permanent virtual circuits (PVCs), etc. If either VLAN or PVC traffic is detected, then the port is associated with a profile related to VLANs or PVCs.

2.7 Failure Processing

In one embodiment, role agent 108 includes logic for processing profile mismatches. Alternatively, error detection is a manual process. In this approach, if incorrect information is received through CDP or another protocol, then an incorrect role may be selected and incorrect configuration changes may be attempted on a given port. Once failures are detected, rule sets can be modified or removed so that the misconfiguration does not happen again in a particular case.

3.0 IMPLEMENTATION MECHANISMS—HARDWARE OVERVIEW

Figure 6:
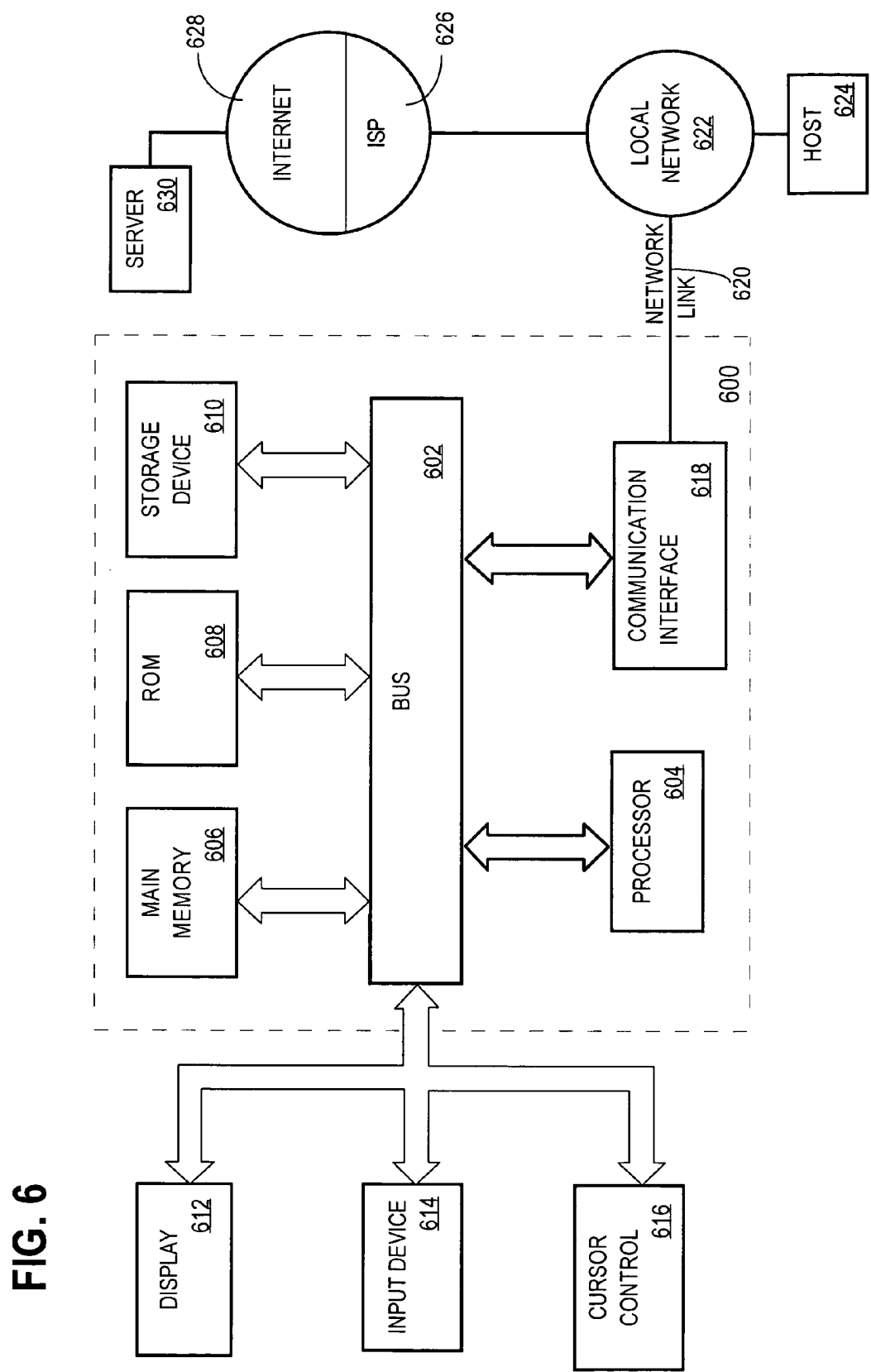
FIG. 6 is a block diagram that illustrates a computer system upon which an embodiment may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer-system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for providing role-based configuration of a port of a network element. According to one embodiment of the invention, role-based configuration of a port of a network element is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for role-based configuration of a port of a network element as described herein.

The received code may be executed by processor 604 as it is received, and/or stored in storage device 610, or other non-volatile storage for later execution. In this manner, computer system 600 may obtain application code in the form of a carrier wave.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising the steps of:
discovering information that identifies a second network element that is coupled to a port of a first network element or describes a device type of the second network element, wherein the discovered information is based on a value in a field of a message sent by the second network element;
associating the port of the first network element with a port role definition selected from a plurality of port role definitions based on the discovered information;
retrieving one or more configuration settings that are associated with the selected port role definition; and
applying the one or more configuration settings to the port of the first network element.

2. A computer-readable storage medium having stored thereon one or more sequences of instructions, which instructions, when executed by one or more processors, cause the one or more processors to carry out the steps of:
discovering information that identifies a second network element that is coupled to a port of a first network element or describes a device type of the second network element, wherein the discovered information is based on a value in a field of a message sent by the second network element;
associating the port of the first network element with a port role definition selected from a plurality of port role definitions based on the discovered information;
retrieving one or more configuration settings that are associated with the selected port role definition; and
applying the one or more configuration settings to the port of the first network element.

3. An apparatus comprising:
a network interface that is coupled to a data network for receiving one or more packet flows therefrom;
a processor;
one or more stored sequences of instructions which, when executed by the processor, cause the processor to carry out the steps of:
discovering information that identifies a network element that is coupled to a port of the apparatus or describes a device type of the network element, wherein the discovered information is based on a value in a field of a message sent by the network element;
associating the port of the apparatus with a port role definition selected from a plurality of port role definitions based on the discovered information;
retrieving one or more configuration settings that are associated with the selected port role definition; and
applying the one or more configuration settings to the port of the apparatus.

4. An apparatus as recited in claim 3, wherein the one or more stored sequences of instructions which, when executed by the processor, cause the processor to carry out the step of associating the port of the apparatus with a port role definition comprise one or more stored sequences of instructions which, when executed by the processor, cause the processor to carry out the steps of:
mapping the port to a profile selected from a plurality of profiles based on the discovered information; and
matching the profile to the selected port role definition.

5. An apparatus as recited in claim 4, wherein the profile comprises a profile identifier, and one or more rules that maps one or more ports to the profile based on the discovered information.

6. An apparatus as recited in claim 4, wherein the profile further comprises a counter indicating a number of ports to which the profile is currently mapped.

7. An apparatus as recited in claim 4, wherein the profile further comprises a counter indicating a number of ports to which the profile is currently mapped, and wherein the steps of retrieving and applying are performed only when the counter is less than or equal to one.

8. An apparatus as recited in claim 4, wherein the port role definition comprises a port role definition identifier, and one or more configuration values that can be applied to the port that is associated with the port role definition.

9. An apparatus as recited in claim 8, wherein the one or more configuration values comprise one or more configuration attribute-value pairs for the port that is associated with the port role definition.

10. An apparatus as recited in claim 8, wherein the one or more configuration values comprise one or more quality of service values for the port that is associated with the port role definition.

11. An apparatus as recited in claim 8, wherein the one or more configuration values comprise one or more lines of a configuration language of the apparatus.

12. An apparatus as recited in claim 3, wherein the discovered information comprises a type identifier of the network element that is coupled to the port of the apparatus; and an identity identifier of the network element.

13. An apparatus as recited in claim 12, wherein the type identifier of the network element is a capabilities type-length-value (TLV) or platform TLV of a Cisco Discovery Protocol (CDP) message from the network element; and wherein the identity identifier of the network element is a sysName TLV of a CDP message from the network element.

14. An apparatus as recited in claim 3, further comprising one or more stored sequences of instructions which, when executed by the processor, cause the processor to carry out the steps of:
providing the discovered information to a management application;
receiving zero or more additional configuration settings from the management application;
applying the additional configuration settings to the port of the apparatus.

15. An apparatus as recited in claim 14, wherein the additional configuration settings are generated based on the discovered information.

16. An apparatus as recited in claim 3, wherein the port is a first port of a plurality of ports, and wherein the apparatus is programmed to automatically configure a selection of one or more ports from the plurality of ports.

17. An apparatus as recited in claim 3, wherein the steps are performed when the apparatus boots up.

18. An apparatus as recited in claim 3, wherein the steps are performed for the port of the apparatus when the port becomes active after a period of inactivity.

19. An apparatus as recited in claim 3, wherein the steps are performed at a specified periodic time interval.

20. An apparatus as recited in claim 3, wherein the one or more stored sequences of instructions which, when executed by the processor, cause the processor to carry out the step of discovering information comprise one or more stored sequences of instructions which, when executed by the processor, cause the processor to carry out the step of:
querying a Cisco Discovery Protocol (CDP) cache of the first element to obtain a Capabilities type-length-value (TLV) and a sysName TLV.

21. An apparatus as recited in claim 3, wherein the apparatus is a switch or router.

22. An apparatus as recited in claim 3, wherein the network element that is coupled to a port of the apparatus is a personal computer, phone, router, server, or storage device.

23. An apparatus as recited in claim 3, wherein the step of discovering is performed in accordance with a protocol selected from the set consisting of Cisco Discovery Protocol, Network-Based Application Recognition, 802.1x, and Simple Network Management Protocol.

24. An apparatus as recited in claim 3, wherein the step of discovering is performed in accordance with a Simple Network Management Protocol, and wherein the discovered information comprises a sysDescr object and sysObjectID of a management information base (MIB) of the network element that is coupled to a port of the apparatus.

25. An apparatus comprising:
   means for discovering information that identifies a network element that is coupled to a port of the apparatus or describes a device type of the network element, wherein the discovered information is based on a value in a field of a message sent by the network element;
   means for associating the port of the apparatus with a port role definition selected from a plurality of port role definitions based on the discovered information;
   means for retrieving one or more configuration settings that are associated with the selected port role definition; and
   means for applying the one or more configuration settings to the port of the apparatus.

26. An apparatus as recited in claim 25, wherein the means for associating the port of the apparatus with a port role definition comprises:
   means for mapping the port to a profile selected from a plurality of profiles based on the discovered information; and
   means for matching the profile to the selected port role definition.

27. An apparatus as recited in claim 26, wherein the profile comprises a profile identifier, and one or more rules that maps one or more ports to the profile based on the discovered information.

28. An apparatus as recited in claim 26, wherein the profile further comprises a counter indicating a number of ports to which the profile is currently mapped.

29. An apparatus as recited in claim 26, wherein the profile further comprises a counter indicating a number of ports to which the profile is currently mapped, and wherein the means for retrieving and applying are performed only when the counter is less than or equal to one.

30. An apparatus as recited in claim 26, wherein the port role definition comprises a port role definition identifier, and one or more configuration values that can be applied to the port that is associated with the port role definition.

31. An apparatus as recited in claim 30, wherein the one or more configuration values comprise one or more configuration attribute-value pairs for the port that is associated with the port role definition.

32. An apparatus as recited in claim 30, wherein the one or more configuration values comprise one or more quality of service values for the port that is associated with the port role definition.

33. An apparatus as recited in claim 30, wherein the one or more configuration values comprise one or more lines of the a configuration language of the apparatus.

34. An apparatus as recited in claim 25, wherein the discovered information comprises a type identifier of the network element that is coupled to the port of the apparatus, and an identity identifier of the network element.

35. An apparatus as recited in claim 34, wherein the type identifier of the network element is the a capabilities type-length-value (TLV) or platform TLV of a Cisco Discovery Protocol (CDP) message from the network element; and wherein the identity identifier of the network element is a sysName TLV of a CDP message from the network element.

36. An apparatus as recited in claim 25, further comprising:
   means for providing the discovered information to a management application;
   means for receiving zero or more additional configuration settings from the management application; and
   means for applying the additional configuration settings to the port of the apparatus.

37. An apparatus as recited in claim 36, wherein the additional configuration settings are generated based on the discovered information.

38. An apparatus as recited in claim 25, wherein the port is a first port of a plurality of ports, and further comprising means for automatically configuring a selection of one or more ports from the plurality of ports.

39. An apparatus as recited in claim 25, wherein the apparatus discovers information that identifies or describes a device type of a network element that is coupled to a particular port of the apparatus and applies configuration settings to the particular port based on the information when the apparatus boots up.

40. An apparatus as recited in claim 25, wherein the apparatus discovers information that identifies or describes a device type of a network element that is coupled to the port of the apparatus and applies configuration settings to the particular port based on the information when the port becomes active after a period of inactivity.

41. An apparatus as recited in claim 25, wherein the apparatus discovers information that identifies or describes a device type of a network element that is coupled to a particular port of the apparatus and applies configuration settings to the particular port based on the information at a specified periodic time interval.

42. An apparatus as recited in claim 25, wherein the means for discovering information comprises means for:
   querying a Cisco Discovery Protocol (CDP) cache of the first element to obtain a Capabilities type-length-value (TLV) and a sysName TLV.

43. An apparatus as recited in claim 25, wherein the apparatus is a switch or router.

44. An apparatus as recited in claim 25, wherein the network element that is coupled to a port of the apparatus is a personal computer, phone, router, server, or storage device.

45. An apparatus as recited in claim 25, wherein the means for discovering is performed in accordance with a protocol selected from the set consisting of Cisco Discovery Protocol, Network-Based Application Recognition, 802.1x, and Simple Network Management Protocol.

46. An apparatus as recited in claim 25, wherein the means for discovering is performed in accordance with a Simple Network Management Protocol, and wherein the discovered information comprises a sysDescr object and sysObjectID of a management information base (MIB) of the network element.

* * * * *